W. L. BROWNELL,

Assignor, by mesne assignments, to A. J. BROWNELL and A. SMITH.

COPPER LINED BOILER.

No. 10,185. Reissued Aug. 22, 1882.

Witnesses:
T. F. Keane
James R. Bowen

Inventor:
W. L. Brownell
By his atty
Edwin H. Brown.

N. PETERS, Photo-Lithographer, Washington, D. C.

UNITED STATES PATENT OFFICE.

WILLIS L. BROWNELL, OF BROOKLYN, NEW YORK, ASSIGNOR, BY MESNE ASSIGNMENTS, TO ANNA J. BROWNELL AND APOLLOS SMITH, BOTH OF SAME PLACE.

COPPER-LINED BOILER.

SPECIFICATION forming part of Reissued Letters Patent No. 10,185, dated August 22, 1882.

Original No. 220,748, dated October 21, 1879. Application for reissue filed April 14, 1882.

*To all whom it may concern:*

Be it known that I, WILLIS L. BROWNELL, of Brooklyn, in the county of Kings and State of New York, have invented an Improvement in Copper-Lined Boilers, of which the following is a specification.

Hot-water boilers for ranges are usually made of copper; but on account of their expense iron boilers are largely employed. These have been galvanized; but in many places the zinc is injured by the water, and these boilers are otherwise objectionable. If the boiler is made of thin copper, it is liable to collapse. In some instances a thin copper boiler has been protected by a winding of wire soldered to the outside and serving to strengthen and stiffen the copper.

My invention relates to a copper-lined boiler and its component parts, made in the manner hereinafter described.

Figure 1:
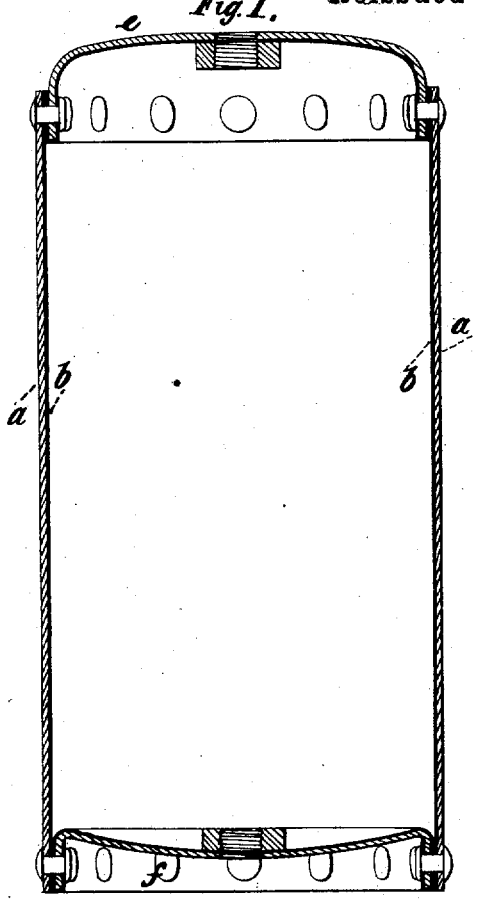
Figure 2:
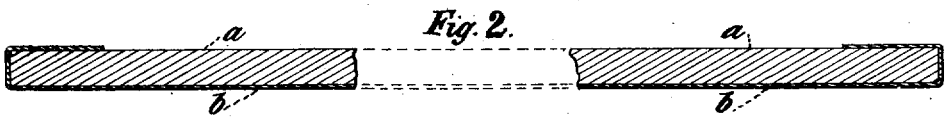
Figure 3:
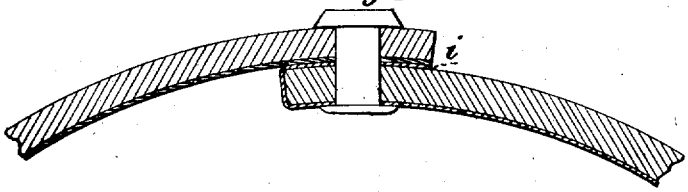

In the drawings, Figure 1 is a section of the copper-lined boiler. Fig. 2 is a partial section of the sheet metal before it is formed into a cylinder, and Fig. 3 is a section of the curved sheets at the joint. Figs. 2 and 3 are in enlarged size.

The sheet of iron, *a*, is of a size to be rolled up into a cylindrical form, and make the entire tubular portion or body of the boiler or a section thereof. A sheet of thin copper, *b*, preferably tinned on one side, is prepared of a size larger than the sheet *a*, so that it may be laid thereon and the edges folded back over the edges of the sheet of iron, as represented in Fig. 2. The combined iron and copper sheets are then bent up into a cylindrical form by means of suitable rollers, which cause the two sheets to set firmly together, so that there is not any space between one and the other, and the copper is held firmly in its proper position in relation to the iron by the edges being turned over. The rivet-holes are perforated in the sheet, and the lapping edges are riveted together, and the boiler cylinder or body is completed and ready for the reception of the heads *e* and *f*, which should also be provided with copper linings. These linings will preferably be turned over the edges of the heads. It will now be apparent that there are two thicknesses of copper at the joint between the two thicknesses of iron, and that the inner edge of the iron is covered up. Hence it is not exposed to rust, and the thicknesses of copper form a packing for the joint. It is preferable to calk the joint by a tool driven against the edge of the copper. I usually cut off any surplus copper, so as to calk both the edges of the copper, as at *i*.

I remark that steel may be used instead of iron, and that a sheet of brass may be employed outside of the sheet of iron or steel, if desired; or the lining may be of brass or other metal that is the equivalent of the copper.

I am aware that soda-water fountains have been lined with sheet metal, and that portions of such fountains have been bolted together. The lining, however, did not pass in between the surfaces, but the same had to be made separate from the vessel and bolts used instead of rivets. By my improvement the edges of the sheets are covered, and the parts are capable of being riveted together in the usual manner.

What I claim as my invention, and desire to secure by Letters Patent, is—

1. In a boiler, the combination of a body consisting of a sheet of iron or steel, and a lining therefor consisting of an independent sheet of brass, copper, or analogous metal, both said sheets having their meeting edges united by the same rivets, forming a longitudinal seam, heads fitted to the body, and linings for the heads independent of the lining of the body, substantially as specified.

2. In a boiler, the combination of a body consisting of a sheet of iron or steel, and a lining therefor consisting of an independent sheet of copper, brass, or analogous metal of corresponding shape, heads fitted to the body, and linings for the heads independent of the lining of the body, said linings being fastened and secured in place by the rivets which fasten the edges of the sheet which forms the body and the rivets which secure the heads to the body, substantially as specified.

3. The copper-lined boiler having the cylindrical portion composed of an outer sheet of iron or steel lined with a sheet of copper, brass, or analogous metal, said copper, brass, or analogous metal being folded around the edge of the iron or steel and the lapped edges riveted, substantially as specified.

WILLIS L. BROWNELL.

Witnesses:

T. J. KEANE,

JAMES R. BOWEN.